J. B. GILLIS, R. J. RHODES AND H. J. LOWE.
SPIKE PULLER.
APPLICATION FILED FEB. 21, 1920. RENEWED JULY 23, 1921.
1,395,956.
Patented Nov. 1, 1921.
2 SHEETS—SHEET 1.
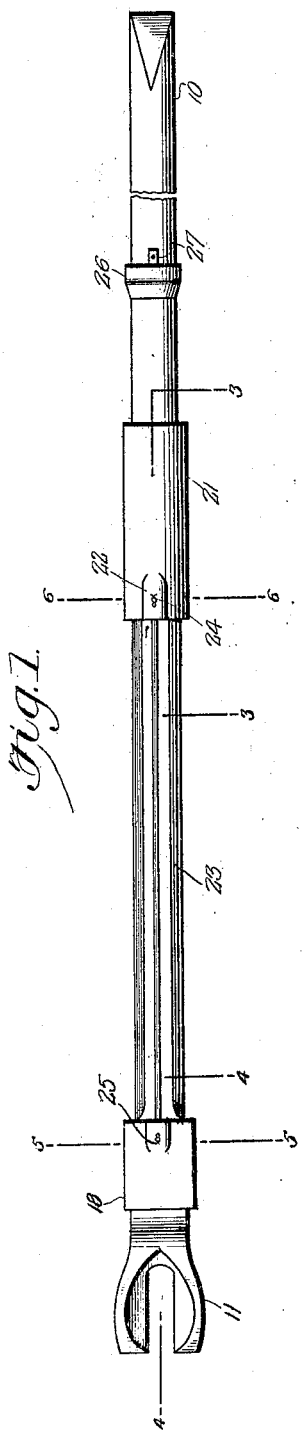
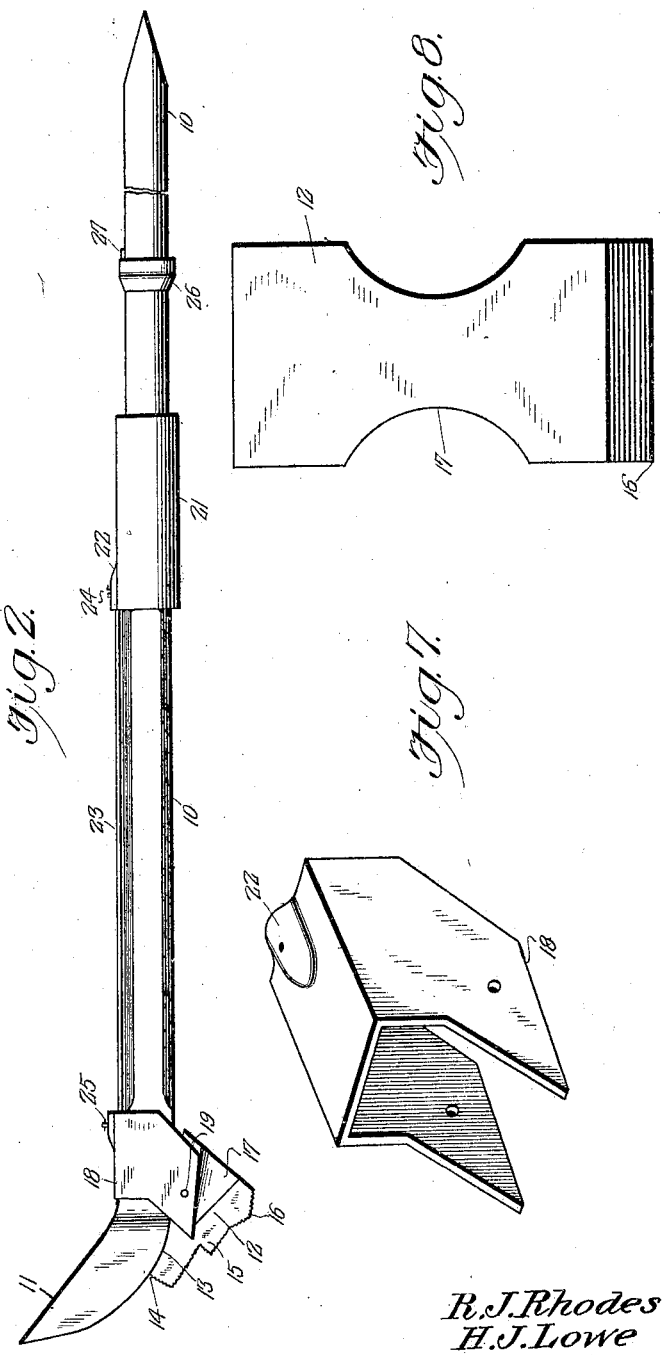
R. J. Rhodes
H. J. Lowe
J. B. Gillis,
INVENTOR
BY Victor J. Evans
ATTORNEY J. B. GILLIS, R. J. RHODES AND H. J. LOWE.
SPIKE PULLER.
APPLICATION FILED FEB. 21, 1920. RENEWED JULY 23, 1921.
1,395,956.
Patented Nov. 1, 1921.
2 SHEETS—SHEET 2.
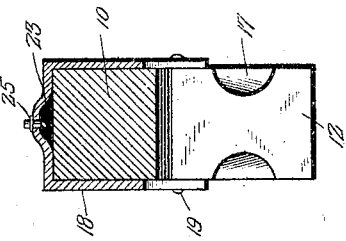
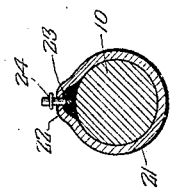
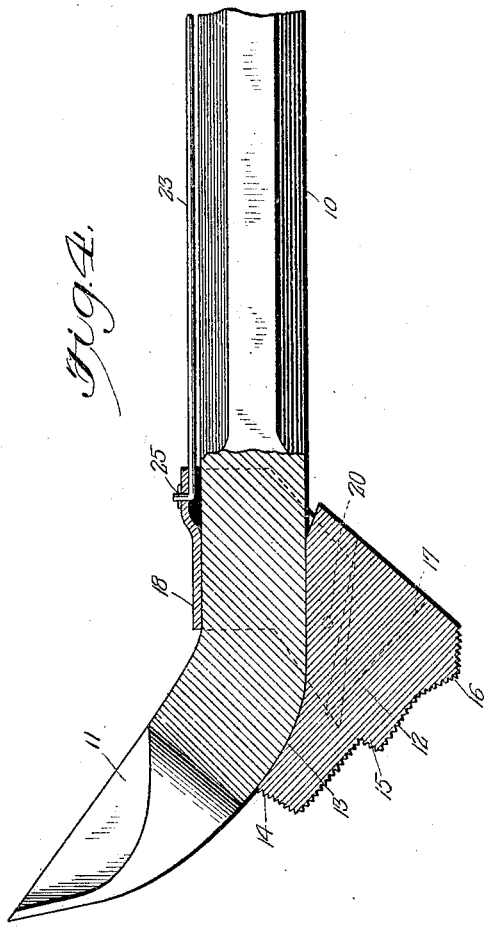
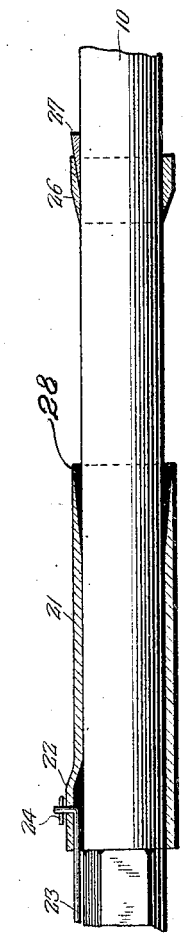
R. J. Rhodes
H. J. Lowe
J. B. Gillis,
INVENTOR
BY Victor J. Evans
ATTORNEY

UNITED STATES PATENT OFFICE.

JAMES B. GILLIS, ROY J. RHODES, AND HOLLIS J. LOWE, OF SALISBURY, MARYLAND.

SPIKE-PULLER.

1,395,956.            Specification of Letters Patent.        Patented Nov. 1, 1921.

Application filed February 21, 1920, Serial No. 360,377. Renewed July 23, 1921. Serial No. 487,131.

*To all whom it may concern:*

Be it known that we, JAMES B. GILLIS, ROY J. RHODES, and HOLLIS J. LOWE, citizens of the United States, residing at Salisbury, respectively, in the county of Wicomico, respectively, and State of Maryland, respectively, have invented new and useful Improvements in Spike-Pullers, of which the following is a specification.

This invention relates to improvements in spike pullers and has special relation to an adjustable fulcrum for the purpose of pulling spikes without bending the same.

An object of the invention is the provision of an adjustable fulcrum, which is simple in construction, positive in operation and which may be detachably secured to a claw bar of standard make.

A further object of the invention is the provision of a spike puller fulcrum of novel construction, which includes a toe extension for partly extracting the spike and a heel extension, which is brought into use for final operation or for pulling an extra long spike.

Another object is the provision of an adjustable fulcrum which is frictionally in an inactive position while the claw bar is inserted beneath the head of the spike, but which may be quickly and easily released so as to position the fulcrum member beneath the bar, whereby the spike may be extracted by one man.

The invention further consists of the following novel features and details of construction, to be hereinafter more fully described, and illustrated in the accompanying drawings.

In the drawings:

Figure 1 is a plan view showing a standard claw bar with the invention applied.

Fig. 2 is a side elevation of the same.

Fig. 3 is an enlarged section on the line 3—3 of Fig. 1.

Fig. 4 is a similar view on the line 4—4 of Fig 1.

Fig. 5 is an enlarged cross section on the line 5—5 of Fig. 1.

Fig. 6 is a like view on the line 6—6 of Fig. 1.

Fig. 7 is a perspective view of the fulcrum member holder.

Fig. 8 is a rear end view of the fulcrum member.

Referring to the drawings in detail like characters of reference denote the corresponding parts throughout the several views.

In illustrating the invention, there is shown a claw bar 10 of standard make, the said bar being wedge shaped at one end and provided at its opposite end with a claw 11, this last named end of the bar being curved as is usual in bars of this character.

The invention comprises a fulcrum member 12, which is curved upon one edge as shown at 13 to conform to the curvature of the end of the claw bar. One end of the fulcrum member is provided with a toe extension 14, while the heel extension 15 is located at the opposite end of the said member. The edges of both the heel and toe extensions are roughened or serrated as shown and the latter is provided with an offset portion 16 upon which the fulcrum may be rocked in the final action of extracting a spike. The fulcrum member is provided upon opposite side faces with depressions 17 to reduce its weight without decreasing its strength.

For the purpose of securing the fulcrum member to the claw bar, there is provided a channel-shaped holder 18 the latter embracing the bar and extending beyond the same and overlapping the side of the fulcrum member, to which it is secured by means of pins 19, which pass through the sides of the holder and engage openings 20 upon each side face of the said fulcrum member.

Slidably mounted upon the bar 10 is an adjusting sleeve 21, one end of the said sleeve being provided with an offset portion 22, which is formed by slitting the sleeve longitudinally and bending the material between the slits outward to provide a housing for one end of a connecting bar 23. This bar passes through an opening provided in the offset portion 22, within which it is secured by means of a cotter pin 24. The opposite end of the bar 23 is secured in a like manner to a similarly formed offset portion 25 provided in the holder 18, each end of the bar being bent substantially at right angles as shown.

It will be apparent from the foregoing description and accompanying drawings, that by sliding the sleeve longitudinally of the claw bar, the fulcrum member may be moved into and out of position for use. In order to hold the fulcrum member out of the way when not in use, there is provided upon the bar 10 a tapered ring or annulus 26, the latter being removably secured to the bar 10 by means of a wedge 27 carried by the bar, the ring or annulus being driven tightly upon this wedge so as to hold it against accidental movement. The adjacent end of the sleeve 21 is flared as indicated at 28 and when this flared end is engaged over the taper of the ring or annulus 26, the sleeve will be frictionally held in engagement with the said ring or annulus and will hold the fulcrum member in an inoperative position. After the claw has been inserted under the head of a spike, the fulcrum member may be moved into position for use by removing the sleeve from engagement with the ring or annulus, whereupon the bar may be rocked upon the toe of the fulcrum member and upon the heel in the final withdrawal of the spike.

The invention is susceptible of various changes in its form, proportions and minor details of construction, and the right is herein reserved to make such changes as properly fall within the scope of the appended claims.

Having described the invention what is claimed is:—

1. The combination with a claw bar, of a fulcrum member adjustably mounted thereon, a channel shaped fulcrum holder slidably embracing the bar and connected to the fulcrum member, a sleeve slidably mounted on the bar and connected to the fulcrum holder and means carried by and surrounding the bar for holding the sleeve against movement.

2. The combination with a claw bar, of a fulcrum member adjustably mounted thereon, a channel shaped fulcrum holder slidably embracing the bar and connected to the fulcrum member, a sleeve slidably mounted on the bar and connected to the fulcrum holder and means carried by the bar for frictional engagement with the sleeve.

3. The combination with a claw bar, of a fulcrum member adjustably mounted thereon, a channel shaped fulcrum holder slidably embracing the bar and connected to the fulcrum member, a sleeve slidably mounted on the bar and connected to the fulcrum holder and a tapered member carried by the bar for frictional engagement with the sleeve.

In testimony whereof we affix our signatures.

JAMES B. GILLIS.
ROY J. RHODES.
HOLLIS J. LOWE.